(12) United States Patent
Begeja et al.

(10) Patent No.: US 8,924,383 B2
(45) Date of Patent: Dec. 30, 2014

(54) BROADCAST VIDEO MONITORING AND ALERTING SYSTEM

(75) Inventors: Lee Begeja, Gillette, NJ (US); Yih-Farn Chen, Bridgewater, NJ (US); David Crawford Gibbon, Lincroft, NJ (US); Huale Huang, Livingston, NJ (US); Rittwik Jana, Parsippany, NJ (US); Zhu Liu, Marlboro, NJ (US); Bernard S. Renger, New Providence, NJ (US); Behzad Shahraray, Freehold, NJ (US); Bin Wei, Basking Ridge, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 95 days.

(21) Appl. No.: 11/256,755

(22) Filed: Oct. 24, 2005

(65) Prior Publication Data

US 2006/0117040 A1    Jun. 1, 2006
US 2009/0234862 A9    Sep. 17, 2009

Related U.S. Application Data

(63) Continuation-in-part of application No. 10/034,679, filed on Dec. 28, 2001.

(60) Provisional application No. 60/296,436, filed on Jun. 6, 2001, provisional application No. 60/282,204, filed on Apr. 6, 2001.

(51) Int. Cl.
     *G06F 17/30*      (2006.01)

(52) U.S. Cl.
     CPC .... *G06F 17/30035* (2013.01); *G06F 17/30828* (2013.01); *G06F 17/30038* (2013.01)
     USPC .......................................... 707/736

(58) Field of Classification Search
     CPC .................................... G06F 17/3002
     USPC .................................. 707/725, 913
     See application file for complete search history.

(56) References Cited

U.S. PATENT DOCUMENTS 6,138,158 A * 10/2000 Boyle et al. ................. 709/225
6,185,527 B1    2/2001 Petkovic et al.

(Continued)

FOREIGN PATENT DOCUMENTS

WO      01/13312      2/2001
WO      01/98920      12/2001

OTHER PUBLICATIONS

Gauch et al., "Real time video scene detection and classification", Information Processign and Management, © 1999 Elsevier Science Ltd., pp. 381-400.*

(Continued)

*Primary Examiner* — Syed Hasan
(74) *Attorney, Agent, or Firm* — Wolff & Samson, PC

(57) ABSTRACT

Described is a system and method for automatic monitoring and dissemination of media content. The system and method include a content acquisition platform receiving media content from at least one source and storing the media content in a media storage platform, a media processing platform segmenting the media content based upon predetermined criteria defined by a user and storing metadata corresponding to the segmented media content in the media storage platform, an alert platform providing the user with an alert identifying the segmented media content, the alert including at least a portion of the metadata stored in the media storage platform and a content delivery platform sending the segmented media content to a device of the user.

20 Claims, 5 Drawing Sheets

(56) References Cited

U.S. PATENT DOCUMENTS

| | | | |
|---|---|---|---|
| 6,345,279 B1* | 2/2002 | Li et al. | 707/104.1 |
| 6,434,520 B1 | 8/2002 | Kanevsky et al. | |
| 6,442,518 B1* | 8/2002 | Van Thong et al. | 704/235 |
| 6,553,100 B1* | 4/2003 | Chen et al. | 379/37 |
| 6,810,526 B1* | 10/2004 | Menard et al. | 725/46 |
| 6,865,384 B2* | 3/2005 | Sagi et al. | 455/412.1 |
| 6,973,665 B2* | 12/2005 | Dudkiewicz et al. | 725/46 |
| 2003/0009469 A1* | 1/2003 | Platt et al. | 707/100 |
| 2003/0069964 A1 | 4/2003 | Shteyn et al. | |
| 2003/0163815 A1* | 8/2003 | Begeja et al. | 725/46 |
| 2004/0225637 A1* | 11/2004 | Heinzel et al. | 707/1 |
| 2005/0028194 A1* | 2/2005 | Elenbaas et al. | 725/32 |

OTHER PUBLICATIONS

Hauptmann et al., "Story Segmentation and Detection of Commercials in Broadcast News Video", © IEEE Computer Society, 12 pages.*

Chang et al., Structural and Semantic Analysis of Video, © 2000 IEEE, pp. 687-690.*

* cited by examiner

BROADCAST VIDEO MONITORING AND ALERTING SYSTEM

This application is a continuation-in-part of U.S. patent application Ser. No. 10/034,679, filed Dec. 28, 2001, which claims priority to U.S. Provisional Patent Application No. 60/296,436, filed Jun. 6, 2001, and U.S. Provisional Patent Application No. 60/282,204, filed Apr. 6, 2001, the disclosures of which are herein incorporated by reference in their entirety.

BACKGROUND OF THE INVENTION

The storage capacity and multimedia presentation capabilities of computing devices enable users to access large collections of information. However, large amounts of new information become available on a daily basis. To gain access to information relevant to the user in a timely manner, automated content processing and notification mechanisms are needed.

SUMMARY OF THE INVENTION

A system for automatic monitoring and dissemination of media content having a content acquisition platform receiving media content from at least one source and storing the media content in a media storage platform and a media processing platform segmenting the media content based upon predetermined criteria defined by a user and storing metadata corresponding to the segmented media content in the media storage platform. The system further includes an alert platform providing the user with an alert identifying the segmented media content, the alert including at least a portion of the metadata stored in the media storage platform and a content delivery platform sending the segmented media content to a device of the user.

A method of alerting users of received media content including receiving media content from at least one source, storing the media content in a media storage platform, segmenting the media content based upon predetermined criteria defined by a user, storing metadata corresponding to the segmented media content in the media storage platform, creating an alert identifying the segmented media content, the alert including at least a portion of the metadata stored in the media storage platform and sending the alert to the user.

A system, comprising a memory storing a set of instructions and a processor executing the set of instructions. The set of instructions being operable to receive media content from at least one source, store the media content in a media storage platform, segment the media content based upon predetermined criteria defined by a user, store metadata corresponding to the segmented media content in the media storage platform, create an alert identifying the segmented media content, the alert including at least a portion of the metadata stored in the media storage platform and send the alert to the user.

DETAILED DESCRIPTION

Figure 1:
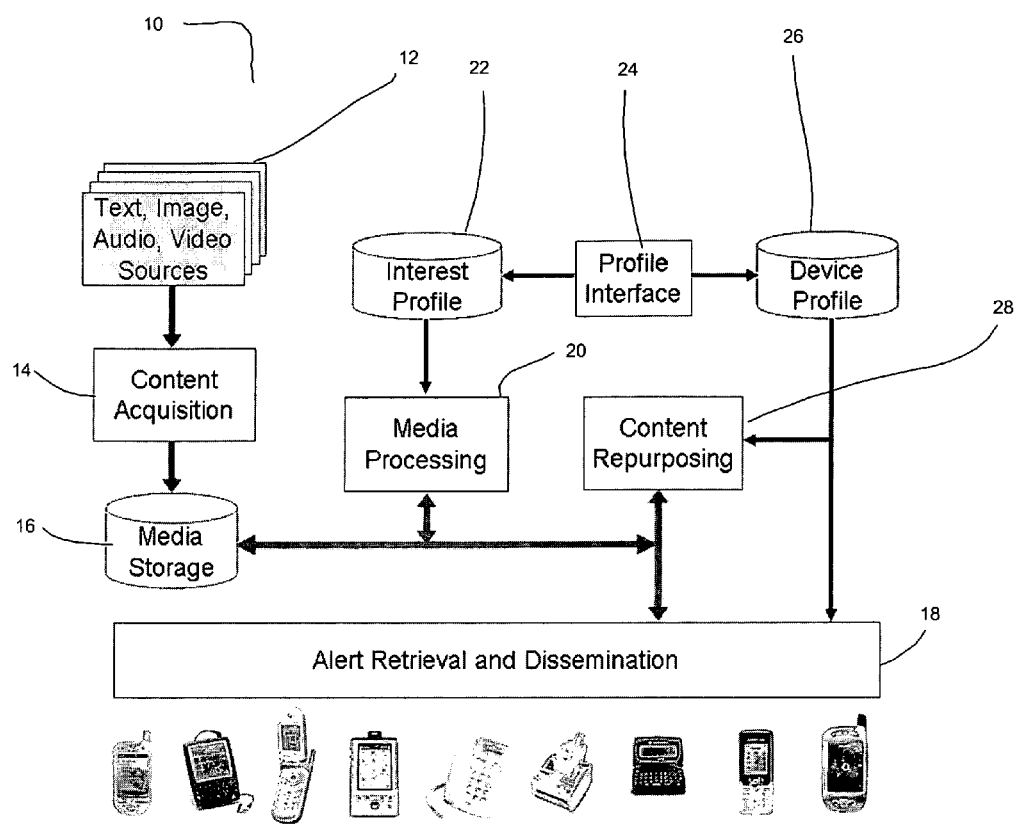
FIG. 1 shows an exemplary system diagram of the architecture of the present invention.

The present invention includes a system and method for the automatic monitoring and the timely dissemination of multimedia information to a range of information appliances based on each user's profile of interest. Multimedia processing algorithms detect and isolate relevant video segments from over twenty television broadcast programs based on a collection of words and phrases specified by the user. Content repurposing techniques are then used to convert the information into a form that is suitable for delivery to the user's devices. Alerts are sent using a number of application messaging and network access protocols including email, short message service (SMS), multimedia messaging service (MMS), voice, session initiation protocol (SIP), fax, and pagers. The system and method of the present invention provides an effective and low-cost solution for the timely generation of alerts containing personal, business, and security information.

The exemplary embodiments will be described with reference to the user's devices being mobile devices. However, those of skill in the art will understand that the devices may be any type of computing device that allows the user to receive multimedia content and/or alerts of such content. Thus, even though the exemplary embodiments describe various mobile devices, the devices may also be more traditional stationary computing devices such as desktop computers, servers, network appliances, etc.

In addition, the exemplary embodiments are also described with reference to media content. While there are specific references to video sources and segmented video, it should be understood that the media content is not limited to video data, but may include any type of media content. For example, the media content may be audio files (e.g., MP3, MPEG-2, Wave files, etc.) from a particular audio source. These files may be processed in the same or a similar manner to the processing of video files described herein.

The exemplary embodiments of the present invention provide a common multimedia processing and alerting platform which enables innovative services to be deployed quickly. Described below are the architectural components of an exemplary system that may be used to implement the exemplary embodiments of the present invention.

In describing the exemplary embodiments of the present invention, a general framework for media alerting services is first described and the architectural components are introduced that are detailed further below for a broadcast video monitoring and alerting system. The exemplary alerting service includes three basic components: media acquisition, alert construction, and alert delivery. First, a mechanism to obtain media sources must be available. In the context of the present invention, media sources may be from public channels or private channels and may be presented in various forms, such as text, images, audio, video or any combination of these. Second, media processing mechanisms must be available to extract information from the media content. Third, alert information must be delivered to target users within a certain time period. The delivery mechanism depends on the devices accessible to end users.

Referring to FIG. 1, there is provided a high-level logical framework 10 of media alerting services. This includes the types of media sources that are used, how content is acquired and processed, and the target devices or protocols that are supported. The common goal of any media alerting system is to obtain relevant content segments from media sources and to deliver them automatically, regardless of where users are and what devices they are using.

The framework 10 shown in FIG. 1 comprises several components, and those skilled in the art would recognize that a subset of the components may be deployed for different implementations of media alerting systems. Those of skill in the art will understand that the framework is described with reference to various components, but that some of these components may be considered processing steps. Thus, the description of the components will be in terms of the functionality that will be provided by these components to implement the exemplary embodiments of the present invention. The described functionality may be carried out by hardware, software or any combination thereof. Where functionality is accomplished through the use of software, i.e., lines of code being executed by a processor, this software may be a single application, function, procedure, etc. or a collection thereof accomplishing the desired functionality.

In FIG. 1, there is shown a source or sources 12 of text, image, audio, and/or video information. From these media sources 12, there is a content acquisition component 14. Preferably, the exemplary embodiments of the present invention focus primarily on video sources. However, the present invention is not limited to video sources. Types of video feeds compatible with the present invention include terrestrial broadcast television, surveillance cameras, satellite broadcasts, and IP streaming media. These feeds may vary widely in terms of content. In particular, the level of post-production processing in the media source has implications for later media adaptation. For example, video processing techniques designed for unstructured video such as from a web camera or closed-circuit security feed may not be suitable for highly produced or structured television news material.

After content is acquired, the media storage 16 keeps both its initial raw format and successive transformations and adaptations for later use. The profile interface 24 collects user interests (interest profile 22) to help extract relevant media clips. The profile interface 24 also collects device profiles 26 which include device protocols and associated device addresses that are then passed to the alert dissemination component 18.

The media processing component 20 is used to detect relevant content, segment the content and convert the content into a form that is amenable for efficient processing. One common process employed is media segmentation, which is critical for alerting applications because long form content does not lend itself well to dissemination over messaging protocols such as SMS nor is it readily consumable on devices with limited user interface capabilities. By automatically segmenting the media based on topics, and adding this logical data structure to the multimedia database, smaller content units are rapidly produced that are of a manageable size to satisfy bandwidth and device storage requirements. The content repurposing component 28 is used to perform media adaptation to support a wide array of device types.

The alert dissemination/retrieval ("ADR") component 18 is responsible for taking the repurposed content from the content repurposing component 28 and delivering it via the appropriate access protocols for a given alert content and a list of recipient devices. One aspect of this ADR component 18 is handling the complexity of scheduling a very large number of alerts to meet stringent time constraints. This may be considered a "Push" operation, e.g., the system pushes content to the user. The ADR component 18 also allows mobile users to query and retrieve alert content through different access protocols. This is a "Pull" operation, e.g., the users pull content to their access devices.

Those of skill in the art will understand that an exemplary system may include other components that are not shown in FIG. 1. For example, an alert reporting/tracking component (not shown) may be used to report and track alerts that have been sent to users and an operations/systems component (not shown) may be used to provide support management functions.

In addition to the accuracy and correctness of media processing for extracting alert content, delay is a factor that affects the overall user experience. The delay time mainly depends on how the media processing is scheduled. From the user's perspective, there may be several types of media alerts with respect to latency. In a first example, alerts may be Scheduled Alerts. In a Scheduled Alert, users are alerted at specific times (e.g., daily, hourly, etc) of any alerts that may have occurred since the last scheduled alert time. This is suitable for users who prefer to be alerted on a predetermined schedule. A disadvantage of Scheduled Alerts is that users run the risk of not receiving alerts in a timely manner.

In a second example, alerts may be Immediate Alerts where the system runs in real-time and attempts to minimize the latency in delivering the alerts. The system may attempt to deliver an alert as an event unfolds and as the media stream is still being acquired. For example, in the case of keyword spotting in broadcast video, it is a relatively easy task to build a system that has low latency from the time the last closed caption character of the keyword was broadcast to the time that the user gets notified. However, topic spotting (e.g., looking for events such as earthquakes or corporate mergers) may be more difficult for Immediate Alerts because topic spotting is challenging to do while the text is streaming into the system. It also raises the possibility that the system may determine that the clip matches a user's interest profile before the clip finishes airing.

In another alert example, the alert may be a Predictive Alert where the system has out of band information, such as an electronic program guide ("EPG"), which allows the system to determine that content matching a user's profile will be available at some point in the future. The user would then be alerted to "tune in" at the appropriate time. There are some well-known systems that use EPG and user interest profiles but they do not involve alerting on various mobile devices. Additional flexibility may be obtained without EPGs. For example, the content may be analyzed to determine if upcoming content will be of interest. For example, the content may include a statement to the effect that "Mt. St. Helens erupted and we will have a live video feed coming up shortly." In such a case, the system may provide a Predictive Alert without the use of the EPG, i.e., the Predictive Alert is derived from previously received content.

The exemplary system described below provides the basis for handling all three types of example alerts. Those of skill in the art will understand that the exemplary system may also handle any other types of alerts. The present invention is a media alerting service (referred to herein as "MediaAlert") that focuses on TV broadcast news as the media source with the goal of delivering repurposed media alerts to a wide variety of mobile devices. The following describes the architectural components of the system based on the model presented above with reference to FIG. 1. The exemplary embodiments of the present invention are implemented by combining a media processing platform with a content delivery platform. The media processing platform is the eClips system as described by L. Begeja, et al., "eClips: Customized Video Clips," talk at WebSummit 2001, which is based on the Digital Video Library (DVL) platform. See, Gibbon, D. et al (1999). "Browsing and Retrieval of Full Broadcast-Quality Video," *Packet Video*, NY, N.Y. The content delivery platform is the Alert Dissemination Engine built on top of the AT&T Enterprise Messaging Network[SM] platform as described in "An alerting and notification service on the AT&T Enterprise Messaging Network (EMN)," *S. Jora, et al., Proceedings of IASTED—Internet and Multimedia*, February 21-23, Grindelwald, Switzerland, 2005. Each of these references, in their entirety, is expressly incorporated herein.

This integration has the advantage of a large digital video library being available for users to search and retrieve video content from as early as the 1990s. In addition, various formats of media content are derived from the original captured video including transcoded video, re-sampled audio streams, associated text either through closed captioning or Automatic Speech Recognition ("ASR"), and key frames. The derived content provides a rich set of resources for satisfying user's requests under various device constraints. Finally, the content delivery platform allows the use of different protocols to communicate with different types of mobile devices. Thus the optimization of content repurposing can be achieved through the knowledge of the device profiles with the necessary transcoding from the appropriate media content.

The content acquisition component 14 of the MediaAlert 10 is next described in more detail. The MediaAlert 10 records selected broadcast TV programs from several broadcasters using satellite and/or cable feeds based on a predetermined schedule and according to the interests of the target audience. In one exemplary embodiment, the content acquisition component 14 may take the form of a bank of digital video recorders linked to a centralized content store. The structured video feeds from broadcast television are then digitized, compressed and stored in a multimedia database, e.g., media storage component 16. The media storage component 16 also includes high level metadata relevant to the content feeds including EPG information such as program title, air date, broadcaster, etc. Those of skill in the art will understand that media storage component 16 is not limited to database type storage, but may be any storage mechanism capable of storing the media content and the other data for use with the present invention (e.g., metadata). Furthermore, since media content is generally high quantity storage data (in terms of bytes), the hardware device on which the media storage component 16 is implemented should have sufficient capacity to store the required number of media clips.

The term metadata is used throughout this description to mean both the information described in the above paragraph, i.e., information that is embedded in the media content such as EPG information, and information that may be derived from processing the content. For example, closed captioning information may be considered embedded information because the close captioned text is included with the media content file. In contrast, if a media file does not include close captioning information, the media file may be processed with automatic speech recognition to derive a transcript of the speech in the media file. Thus, the text transcription of a media file may be obtained by extracting embedded data (e.g., close captioning text) and/or by processing the media file and deriving information (e.g., automatic speech recognition). In either case, this data may be referred to as metadata in this description. Those of skill in the art will understand that there is any number of types of data which may be embedded within a media file and which may be extracted from a media file by processing the file. Any of this data may be referred to herein as metadata.

The media processing component 20 of the MediaAlert 10 is described below. After the content is acquired, the media is processed to identify and segment relevant pieces of information. Generally, the EPG data is too sparse to provide focused, concise, multimedia information that is relevant to the users. To address this, the exemplary embodiments of the present invention automatically process the content of media streams, individually, and collectively using multimodal processing techniques build a rich content-based index for information retrieval, media segmentation, and media adaptation. The details of the media segmentation techniques used are described in "Multimedia Processing for Enhanced Information Delivery on Mobile Devices," *Emerging Applications for Wireless and Mobile Access*, MobEA II, New York, D. Gibbon, et al. May 18, 2004, which is incorporated, in its entirety, herein.

The results of the processing include high-level content features such as the locations of topic boundaries, topic keywords, and representative images for each topical content segment. Additionally, mid-level features are extracted as part of the media processing component 20 functionality and these are also maintained in the media storage component 16. The mid-level feature may include, for example, locations of scene boundaries, representative images for each scene (e.g., key frames), actual dialog text or an approximation of the dialog text either in the form of closed caption text or the results of speech recognition (e.g., a word lattice or 1-best transcription.), etc.

The content repurposing component 28 of the MediaAlert 10 is described below. The high and mid-level content features described above can be exploited to enable the alerting system to support a wide range of device types. Examples of media adaptation will be discussed in detail below and examples will be provided with reference to FIGS. 3 and 4. The interest profile 22 obtained through the profile interface 24 (described in more detail below) is used to find content that matches the user keywords. The device profile 26 dictates the type of content that is compatible with the user devices. The content repurposing component 28 receives the selected content and the device profile information and repurposes the content depending on the destination device. If a user is designated to receive content on more than one device, the content repurposing component will repurpose the content for each of the multiple devices on which the user is designated to receive the content.

The ADR 18 will receive the repurposed content from the content repurposing component 28 and will send the content to the user's device. The ADR 18 of the MediaAlert 10 may be, for example, a middleware solution that allows limited mobile devices to communicate with each other and to securely access corporate and Internet content/services. It may include, for example, gateways and servers and is an instance of the AT&T Enterprise Messaging Network (formerly known as iMobile-EE, See, Y. Chen, et al., "iMobile EE—An Enterprise Mobile Service Platform," *Wireless Networks*, Vol. 9, No. 4, pp. 283-297, July 2003), which is incorporated, in its entirety, herein.

Gateways handle protocol specific interfaces to mobile devices and perform authentication, device profiling and session management functions. Servers perform the task of verifying device accounts and scheduling may be replicas and may be load balanced for enhanced reliability. The system operates as a dynamic environment, with gateways and servers discovering and adjusting their capabilities dynamically. Both gateways and servers can be dynamically added/removed to the system. Interconnecting the gateways and servers is a message based communication infrastructure using both point-to-point and multicast models.

The platform provides gateways that host devlets (protocol interfaces) for a multitude of protocols: email, http, pager, voice, fax, SMS, instant messaging, etc. Multimedia messaging is supported through the use of an MMS gateway that retrieves the picture/video content from the media storage component 16 and sends it to an MMS service provider through an HTTP connection. Being the access points for both end user/devices and external systems, the gateways perform session initiation and management functions. Within each user session, the exemplary embodiment of the present invention maintains an associated delivery context. Those of skill in the art will understand that the above description is directed to a protocol having defined sessions. However, the present invention is not limited to any particular type of protocol and may be implemented regardless of the protocol which is used communicate.

The message oriented devlets are based on a messaging framework that covers the protocol specific implementations. It provides a clean separation between the application messaging protocols (for example 'pager') and the network access protocols used to deliver the messages. For example, for a pager, SMTP or SNPP are normally used. The framework offers support for message delivery tracking, selective retry policies, delivery channel monitoring, outbound to inbound message matching, and resource/bandwidth allocation.

In the context of the notification engine implemented within the platform, only some protocols are used as delivery channels, in particular, the message based asynchronous protocols: mail, SMS, instant messaging (e.g., Jabber, AIM, etc), pager, voice, and fax. Their main characteristics are that a recipient can be uniquely identified through a permanent protocol specific address: email address, phone number, etc. As a consequence, it is possible to perform a 'push' of a message towards the end recipient. Thus, any protocol having this characteristic (i.e., unique identification of recipient) may be used for the delivery channel.

The components that make up a server's behavior may be referred to as "infolets." Infolets implement the associated application logic and usually provide the access to one or more sources of information. Since the infolet output needs to be provided with respect to the delivery context established for the user session, the ADR 18 offers a framework for information transcoding that can be used by the infolet provider. However, in this exemplary embodiment, the ADR 18 does not perform automatic transcoding itself. A particular class of infolets, called services, is dedicated for programmatically exposing functionality to external systems in contrast with other classes which provide content to the end user devices. The different components of the ADR 18 are implemented as a set of web services operating on top of the infrastructure.

The MediaAlert 10 supports the delivery of alerts with a range of media content including text, images, audio and video. The devices that are supported range from devices with limited display and processing capabilities such as pagers which can only handle limited text information or regular voice phones which can only receive phone calls, to PDA devices with video streaming capability. Exemplary devices that may be supported by the MediaAlert 10, including device descriptions and messaging capabilities of these devices, are listed in Table 1 below. The MediaAlert 10 allows users with the flexibility to use any device.

TABLE 1

User Device Descriptions

| Device | Description | Messaging Capabilities |
|---|---|---|
| 1) PPC 2002 Smartphone | Siemens SX56 | GSM/GPRS/SMS |
| 2) MMS Phone | SonyEricsson T610 | GSM/GPRS/SMS/MMS |
| 3) Alphanumeric Pager | Skytel pager | Email/Paging |
| 4) Numeric Pager | Metrocall pager | Email/Paging |
| 5) Blackberry | Blackberry 6710 | GSM/GPRS/Email/SMS |
| 6) Cell Phone | Nokia 3310 | GSM/SMS |
| 7) PPC 2003 Smartphone w/ WiFi | O2 Xda II | GSM/GPRS/SMS/ WiFi/Bluetooth |

A user may interact with the system in two manners. First, the user may utilize a Web interface to provision their devices and their interest profiles. Second, as new content is acquired that matches the user profile, the user will receive alerts on their selected devices. The provisioning component of the present invention is described first below and the alerting component is described thereafter.

The exemplary embodiments maintain a distinction between the user contact list and the user notification list. Users can choose a subset of their devices from the contact list to be used for notification purposes. The user can access the alert content via phone, VoIP, or other standard protocols. Audio can be delivered by, for example, making an alert call to a phone or to a Voice over IP ("VoIP") client using the SIP protocol. Alternatively, the user can call a toll free Phone Access Number to hear the audio content to directly access the VXML interaction. In each of these cases, a Phone Access PIN may be used to authenticate the user. Alerts can also be delivered to Email, Fax, Numeric or Alphanumeric Pager, and to SMS or MMS enabled devices. Exemplary protocols supported by the assortment of devices listed previously are shown in Table 2. All user and device information may be pre-provisioned. Consequently, relevant user profile information is already available at the time of the alert generation in order to efficiently perform the dissemination.

TABLE 2

Device Protocols

| Devices/ Protocols | Voice | VoIP | Desktop Email | PDA Emil | Numeric Paging | Alpha Paging | SMS | MMS |
|---|---|---|---|---|---|---|---|---|
| 1) PPC 2002 Smartphone | X | X | | X | | | X | |
| 2) MMS Phone | X | | | X | | | X | X |
| 3) Alphanumeric Pager | | | | | | X | | |

TABLE 2-continued

Device Protocols

| Devices/ Protocols | Voice | VoIP | Desktop Email | PDA Emil | Numeric Paging | Alpha Paging | SMS | MMS |
|---|---|---|---|---|---|---|---|---|
| 4) Numeric Pager | | | | | X | | | |
| 5) Blackberry | X | | X | X | | X | X | |
| 6) Cell Phone | X | | | | | | X | |
| 7) PPC 2003 Smartphone w/WiFi | X | X | | X | | | X | X |

The user interest profile 22 may be created via a web page where the users provision their topics and associated keywords as well as the program sources for each topic. Each topic in the profile may have different keywords and can use a different subset of the available program sources. An alert is only sent if the keywords for a topic in the interest profile match content in the program sources associated with this topic. Keywords for topics may be correlated against closed caption text, speech recognized audio segments and other metadata like EPG.

After each TV news program is acquired and processed, the audio and video are transferred to the media storage component 16 which will ultimately stream the content to the devices that support streaming. The metadata and closed caption text are sent to an index server where the content is indexed. Various approaches can be used to match new content with user profiles. In one exemplary implementation, a task runs at specific times in the day for each user and identifies new content that matches the program sources and keyword requirements for each topic. The first step in this task is to flag the alert content for each user. All new content since the last alert time is written out to an XML file for each user. This file includes data from the index and the data from post-processing. The above mentioned task not only extracts the relevant clips but also repurposes the content and interfaces with the ADR 18 via the web services to send out the alerts automatically.

Other approaches could entail real-time word spotting of the closed caption text as the content is being acquired. The alerts could effectively be sent immediately. Of course, the clipping segmentation and indexing algorithms would be less effective since it would not have the advantage of analyzing the entire broadcast.

To support different protocols and devices, the present invention repurposes the content to match the device requirements in the profile. The content repurposing is accomplished by using the relevant information in the XML file. For instance, an alert fax may contain the full text of the clip whereas all the other alerts may use the synopsis text.

Table 3 shows exemplary content elements used for each device protocol. Note that most of the content elements come directly from the XML file while others are derived from the information in the XML file. For instance, the synopsis text is stored in the "text" attribute of the "clip" element in the XML file as can be seen in Table 4.

TABLE 3

Content vs. Device Protocols

| Content/ Protocols | Voice VoIP | Desktop Email | PDA Email | Fax | Numeric Paging | Alpha Paging | SMS | MMS |
|---|---|---|---|---|---|---|---|---|
| 1) Callback Number | | | | | x | x | x | x |
| 2) Hyperlink to Video | | x | x | | | | | x |
| 3) Program Icon | | x | | | | | | x |
| 4) Program Name | x | | | x | | | | |
| 5) Date | x | x | x | x | | x | | x |
| 6) Topic | x | x | x | x | | x | | x |
| 7) Duration | x | x | x | x | | | | |
| 8) Thumbnail | | x | | x | | | | |
| 9) Synopsis Text | | x | x | | | x | x | x |
| 10a) Full Text | | | | x | | | | |
| 11) Audio | x | | | | | | | |

TABLE 4

XML Content vs. Device Content

| Content | XML Element | XML Attribute |
|---|---|---|
| 1) Callback Number | usercontent | emnnumber |
| 2) Hyperlink to Video | clip | video |
| 3) Program Icon | clip | banner |
| 4) Program Name | clip | title |
| 5) Date | clip | date |
| 6) Topic | topic | name |
| 7) Duration | clip | duration |
| 8) Thumbnail | clip | thumbnail |
| 9) Synopsis Text | clip | text |
| 10a) Full Text | clip | textfull |
| 11) Audio | clip | [derived] |

Figure 2:
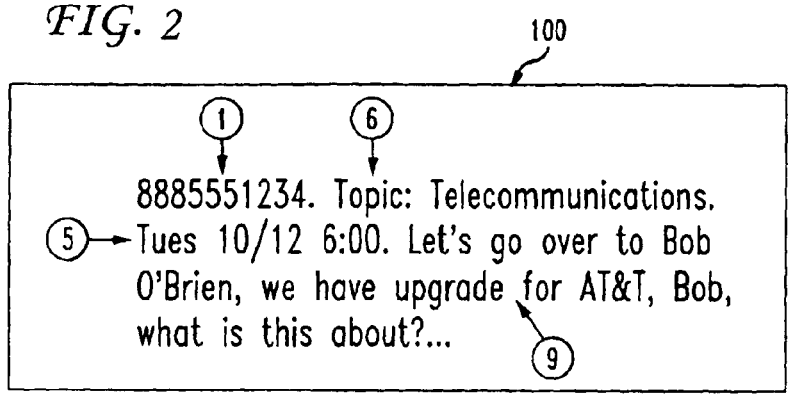
FIG. 2 shows an example of alphanumeric pager content according to the present invention.

For text-only devices such as pagers and SMS devices, the MediaAlert 10 provides the text content to the devices including a callback number. The text may be truncated to satisfy device requirements. FIG. 2 shows an exemplary alert 100 for an alphanumeric pager. The different elements from Table 3 are labeled accordingly. Thus, the alert 100 includes a callback number (e.g., 888-555-1234), a Topic (e.g., Telecommunications), a date/time (e.g., Tues 10/12 6:00) and Synopsis text (e.g., Let's go over to Bob O'Brien, we have upgrade for AT&T, Bob, what is this about?).

Note that for some devices/protocols, it is possible to send a hyperlink to the video. The media streaming server must be engineered to handle such video-on-demand requests based on the number of expected concurrent users. In a preferred embodiment, the present invention uses Microsoft media streaming server. Other video types can be created during the media adaptation process.

The voice content is delivered to a phone or VoIP client via a VXML/SIP gateway via a remote dial option of the gateway.

The audio alert content is created from the original video during media processing. The user can navigate the call using Touch-Tone commands or speech input. The prompts are played via TTS (text-to-speech) but the audio alert content is played back from the audio file. As previously discussed, the users can always dial the callback number at their preferred time instead of having the system call them.

Figure 3:
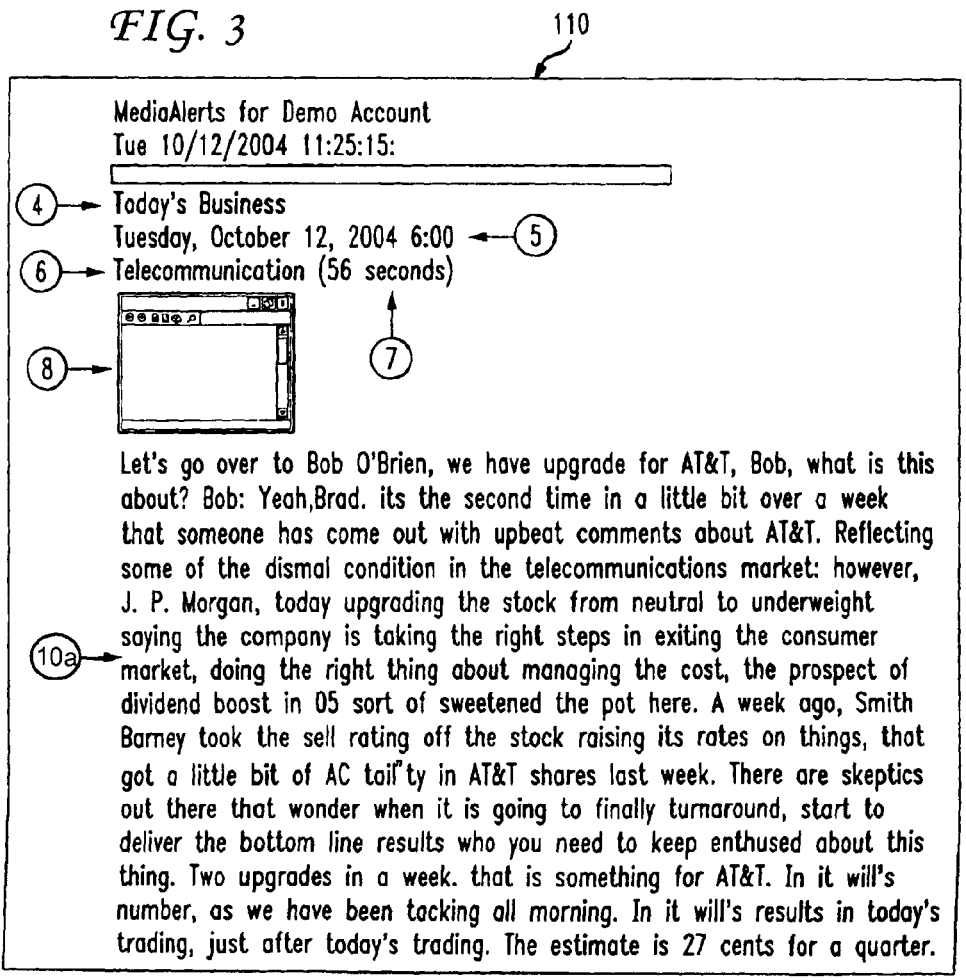
FIG. 3 shows an example of fax content according to the present invention.

For devices that can handle text and images, such as fax machines and MMS phones, a combined text and image representation is generated for delivery. FIG. 3 shows an exemplary fax alert 110 that is also labeled in accordance with the elements of Table 3. The MediaAlert 10 may generate HTML files that are sent to a fax broker which passes on the alert. For MMS phones, the MediaAlert may compose the image portion and the text portion into an MMS message suitable for delivery by an MMS broker. Several clips can be concatenated and sent in one MMS message.

Figure 4:
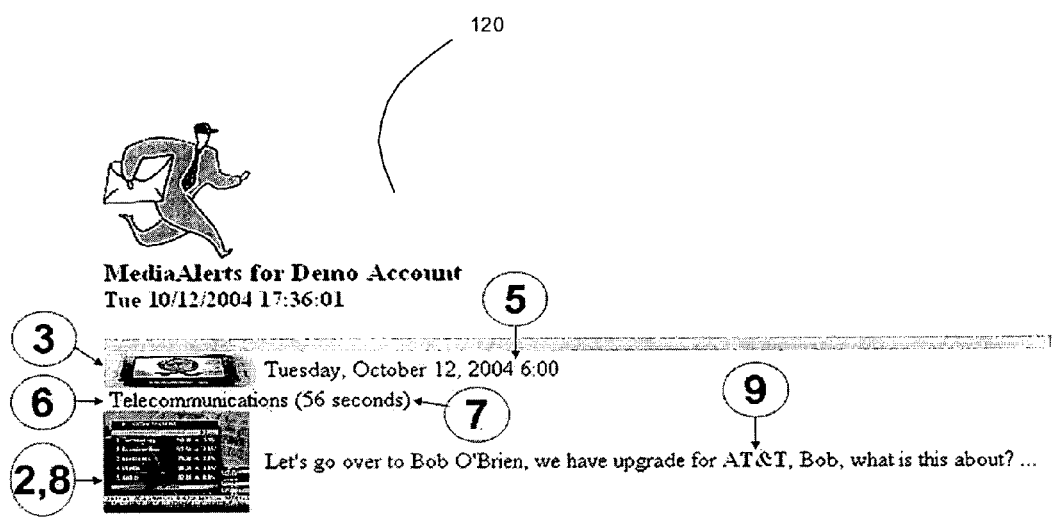
FIG. 4 shows an example of desktop email content according to the present invention.

For devices that can receive HTML formatted email, the MediaAlert 10 may send HTML email to the users directly. FIG. 4 shows an exemplary desktop email alert 120 that is also labeled in accordance with Table 3. The thumbnail is a link to the video so clicking the thumbnail will stream the higher bit rate video. For video enabled mobile devices, such as PocketPC PDAs, the MediaAlert 10 may send a video link through the PDA email. The user can then stream the video by clicking on the link.

The above has shown that the alerts may be sent with varying content to various user devices, thereby allowing the user to retrieve the desired content. The desktop email, PDA email, fax, numeric pager, alphanumeric pager, SMS, and MMS content may be sent via the relevant ADE gateways. The Voice and VoIP content may be delivered to the Phone Number or SIP address using the VXML/SIP gateway. Since the MediaAlert 10 may send alerts to different devices that may be on different networks, the data transmission varies across different networks and protocols. The following will provide two examples (i.e., MMS and fax) to provide an exemplary process involved in delivering alerts on various networks.

Each MMS phone registered for alert delivery is uniquely identified in the MediaAlert system 10 by its phone number and it is mapped to a particular user. The MMS gateway interacts with an MMS service provider using an HTTP connection. Typically, an MMS provider hosts an MMSC gateway and maintains connections to cellular carriers globally. Unlike the other gateways in the ADR 18, the MMS gateway repurposes the content and sends out the alert. For the other gateways, the content is repurposed and is passed as plain or HTML text or as an HTML file to the destination gateways. In the case of the MMS gateway, the URL of the XML file is passed. The MMS gateway parses this XML file to locate all the images, text, and other content elements relevant to an MMS alert. It then retrieves these elements from the media storage component 16 and sends the MMS message out to the MMS service provider.

For the fax gateway, the MediaAlert 10 sends an electronic mail to a fax broker, e.g., eFax, J2, etc. The fax gateway is enhanced to support email with attachments and receives HTML content containing image URLs inside an Intranet that the fax broker cannot directly access because of firewall issues. There are several ways to solve this, such as opening a port, using a reverse proxy, or converting HTML to other document formats. Preferably, the HTML file is converted to a PDF document that can be emailed to the fax broker as an attachment. The end result is a fax alert 110 that contains text and images as shown in FIG. 3.

The above described implementation of the MediaAlert system 10 was evaluated with reference to system performance the user's experience. The performance was evaluated by measuring the execution time of various components under different conditions. Since the MediaAlert 10 comprises media processing and alert dissemination as two relatively independent components, the two are treated separately in the performance studies so that more detailed data for each component can be obtained.

Figure 5:
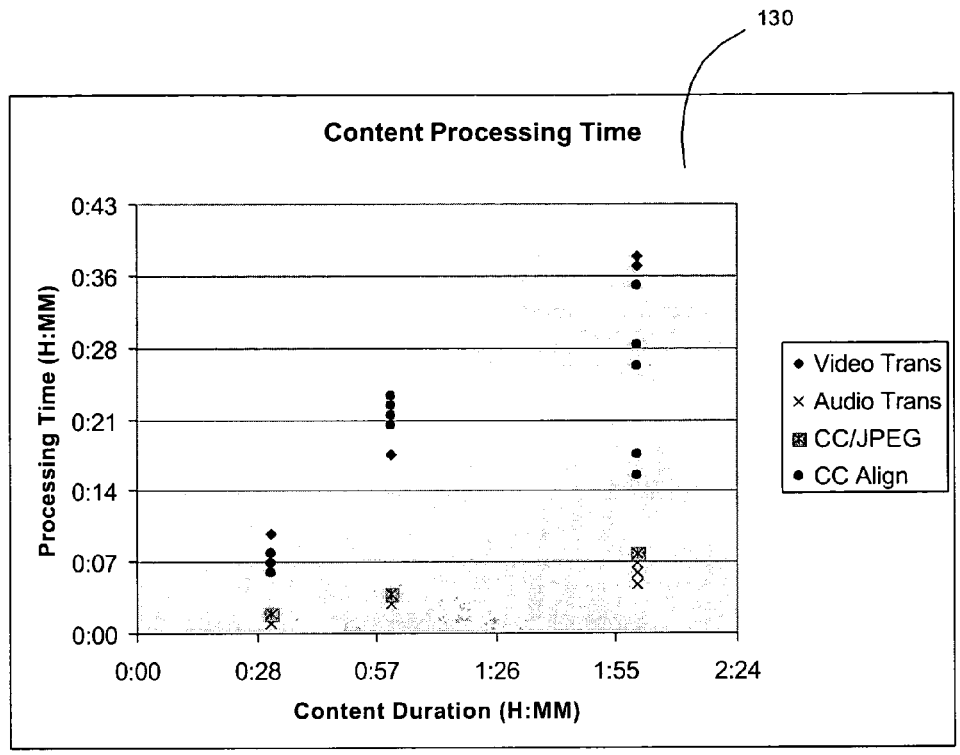
FIG. 5 is an exemplary graph showing content processing time versus content duration.

Initially, the media processing performance is evaluated. Media processing occurs after the video acquisition and has two main features: content processing and clip generation. The content processing applies to the full video and the clip generation applies to the portions of the video content that are sent as an alert. The full video processing steps include: video transcoding, audio transcoding, closed caption ("CC") and JPEG processing, and CC alignment with speech. Table 5 lists the elapsed time and the percentage of the total time in each step for a 100 second video. The total processing time is 91 seconds or 91% of the source video time, meaning that the MediaAlert system 10 may handle video streams in real-time. FIG. 5 shows a graph 130 of content durations versus processing time for exemplary data from the acquisition of 17 video streams, from 30 minutes to 120 minutes. As shown in this graph 130, the transcoding time depends almost linearly on the length of the source video. Video transcoding takes about 31% of the video time; audio transcoding is 6% and CC/JPEG processing is 7%. The time for CC alignment processing depends on the content, ranging from 13% to 39% of the video time. The acquisition was performed by a 1 GHz dual-processor Pentium III for one broadcast input.

TABLE 5

Content Processing Times (100 second video)

| Content Processing Steps | Time (sec) | Percentage |
| --- | --- | --- |
| Video transcoding | 38 | 42% |
| Audio transcoding | 6 | 6% |
| Caption text/JPEG processing | 7 | 8% |
| Caption alignment with speech | 39 | 43% |
| Other | 1 | 1% |
| Total | 91 | 100% |

Figure 6:
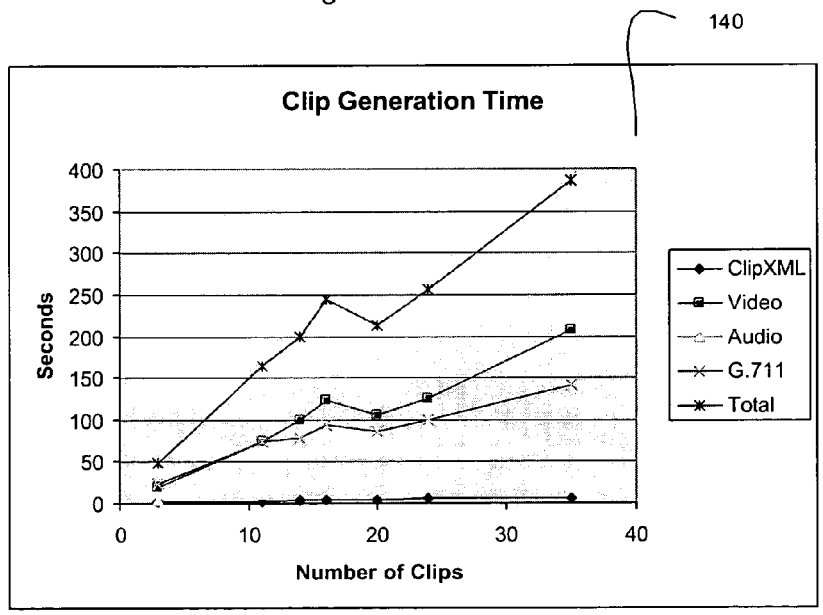
FIG. 6 is an exemplary graph showing clip generation time versus number of clips.

FIG. 6 shows a graph 140 illustrating the timing information for clip generation including the generation of the clipping information for the XML file, extracting video and audio clips, and obtaining uncompressed audio (e.g., G.711 standard audio) for use with the VXML audio playback. These tests were performed by varying the number of clips from 3 to 35 by adjusting the time window of the search. Among the processing steps, clipping video is the most time consuming part. Uncompressing audio also takes a relatively long time because the exemplary MediaAlert system 10 used off-the-shelf tools directly without optimizing for the particular purpose. Thus, by including optimized audio compression algorithms, additional time may be saved in the processing of clips.

A portion of the same data is also available in Table 6, which gives the average clip duration and the average clipping time to process one clip. From Table 6, it is seen that clips with an average duration of 87 seconds long take 13 seconds to clip on average which is 15% of the clip duration time. This implies that the system is very efficient in processing clips. Compared with the content processing time, the clipping processing time is much less. The data was collected on a 2.4 GHz dual-processor Pentium machine.

TABLE 6

Clip Duration/Processing Times

| Clips | Average clip duration (sec) | Average clip processing (sec) | Processing/Duration |
|---|---|---|---|
| 3 | 105.67 | 16.00 | 15% |
| 11 | 96.00 | 14.82 | 15% |
| 14 | 87.57 | 14.21 | 16% |
| 16 | 87.63 | 15.19 | 17% |
| 20 | 80.40 | 10.60 | 13% |
| 24 | 79.63 | 10.63 | 13% |
| 35 | 69.26 | 11.03 | 16% |
| Avg. | 86.59 | 13.21 | 15% |

Figure 7:
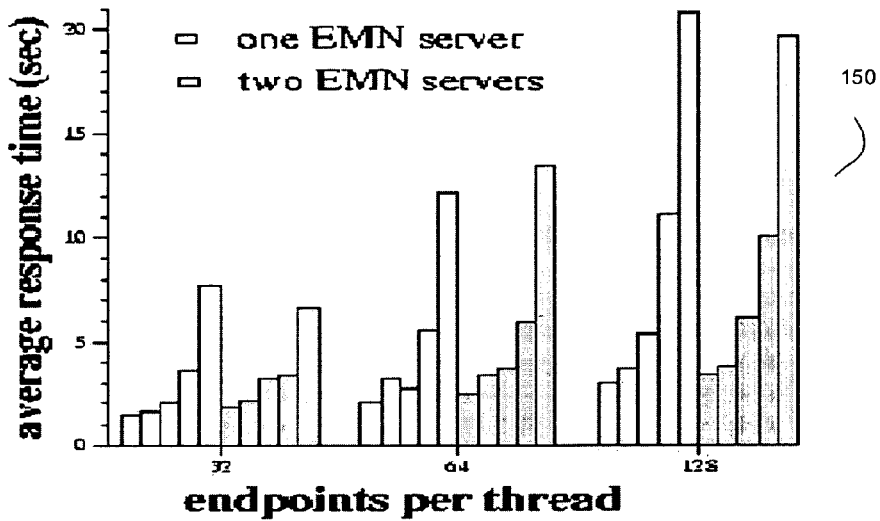
FIG. 7 is a first graph showing average server response time according to the present invention.
Figure 8:
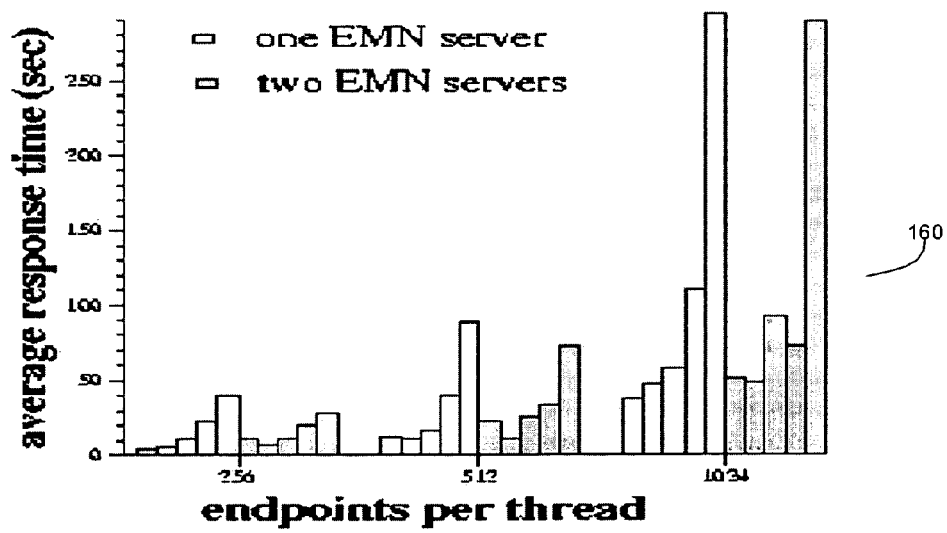
FIG. 8 is a second graph showing average server response time according to the present invention.

The performance of the alert dissemination was also evaluated for exemplary email alerts. FIGS. 7 and 8 show exemplary measurements 150, 160, respectively, at the client side from the when the alert injection requests are sent to the time when the server responses are received. This is the time that is required to satisfy an alert specification and output a time slotted schedule. This schedule determines when each alert is disseminated. The client machine simulates alert requests with multiple threads at The inventors used an EMN (Enterprise Messaging Network) testing framework which is capable of simulating multiple threads of alert requests. In FIGS. 7 and 8, the number of threads is configured as 1, 2, 4, 8 and 16. The number of endpoints (number of recipients of an alert) that each client thread generates varies from 32, 64, 128, 256, 512 to 1024. To show performance measurement results of these configurations, representative endpoints of 32, 64 and 128 are shown in FIG. 7. The results with endpoints from 256 to 1024 are shown in FIG. 8. For each figure, the five un-shaded bars on the left indicate the number of threads being used, i.e., from left to right, the number of threads is 1, 2, 4, 8 and 16. These un-shaded bars are for the cases when there is only one EMN server. Similarly the five shaded bars indicate the cases when there are two EMN servers. Note that due to the distributed nature of the platform it is possible to load balance the alert processing via identical EMN servers and therefore accommodate a larger number of users. New servers may be started automatically if the sustained load exceeds a certain safety threshold, thereby maintaining scalability. The increasing number of endpoints shows the workload change. The one-server and two-server cases are put side by side for ease of comparison. In this example, the client uses a 1.4 GHz dual-processor Pentium machine running a Linux 2.4 kernel and the gateways and EMN Servers use 2.4 GHz quad-processor Pentium machines with a Linux 2.4 kernel.

FIGS. 7 and 8 indicate that the server response time increases when the number of requests increases. As can be seen from the figures, the system can process alerts that include 16384 email recipients (16 threads with 1024 endpoints each) in less than 300 seconds with either one or two servers. The actual end-to-end email dissemination time took less than 700 seconds. However, even for large requests, the two-server configuration with two JMS (Java Messaging Service) queues has similar performance as the one server case. This indicates that the system bottleneck is not at the server engines. One possible bottleneck may be database access, i.e., because all the requests need to access the common database.

Based on the data collected, media processing tends to take longer than alert dissemination, especially for a small number of users. To balance the system performance, it is needed to first reduce the media processing time. The number of broadcast news channels is limited by the number of available channels but the number of users can be increased arbitrarily. To be cost effective, a good balanced system relies on the scale of the service.

The final delivery time from the server to an end device, which depends on the access mechanism available on the device, can also add a significant delay to the alerting process. For example, the delivery of MMS messages to a mobile phone. In one experiment, a one-character MMS message took 49 seconds, while for messages with multiple text and picture components, it took 90 seconds for 20 KB of data and 114 seconds for 40 KB of data. The time fluctuations between different runs can be substantial. In a further example, MMS message delivery may take more than 10 minutes because the messages have to traverse different networks and the delay can be very long and unpredictable. In such extreme cases, there needs to be a mechanism to detect the abnormality immediately and to switch to an alternative device for the user.

The following describes experience with the MediaAlert system 10 on several mobile devices. The Blackberry 6710 is a versatile GSM/GPRS mobile device with voice, email, SMS, and paging capabilities. New email is pushed automatically to a Blackberry device without the mobile user having to access a mailbox explicitly. Also, the Blackberry can handle large amounts of email text by simply requesting for more email from the Microsoft Exchange server. This makes the Blackberry an ideal device for receiving comprehensive text alerts.

Initially, the callback number was included only for protocols with limited text abilities (such as paging and SMS). For example, more than 140 characters (and sometimes 100) in an SMS message cannot be sent to most phones. The callback number is included so that users can call back to get the complete audio clip. On the Blackberry 6710, any sequence of digits (such as 9735551212) that looks like a phone number is clickable and the clicking initiates a call to that number. This is true for both SMS messages and email messages received on that device. This feature makes it very convenient for retrieving audio alerts and has increased voice usage of the Blackberry 6710. It has also prompted the addition of a callback number to email alerts.

Similarly for an MMS message, the MMSC sends the user a notification that a new message is waiting. The receiver can then download the message immediately or download it later (user pull rather than a user push request). Although an MMS message can encompass a wide range of content types, it is a logical extension of SMS, making it easily adoptable for today's generation of mobile users. Another advantage of MMS for this kind of alert is that the message is delivered as a single multimedia message and not as a text message with attachments. This minimizes the steps that the user has to take to retrieve the content.

An experiment was done on the Xda II device (Smartphone with PocketPC 2003, WiFi, and Bluetooth) with low bit rate streaming video alerts using the Microsoft Media Player. Experiments were conducted on an internal server. A lower bit rate of 150 kbps was used for streaming content to these PDAs. Overall, the mobile user is able to watch the streaming video comfortably without much data loss. As most 2.5G and 3G wireless networks are still limited in bandwidth, the retrieval of high quality video alerts is expected to become feasible first on WiFi networks. The convergence of 3G and WiFi/WiMax on a new generation of cell phones will allow the users to retrieve videos with varying degrees of quality depending on the cost/network availability.

The above comments on user experience are based on scheduled alerts. Other types of alerts can be handled in a similar fashion or treated differently. The MediaAlert system 10 user profile can be extended to incorporate other attributes like location, presence and context. Thus, the MediaAlert system 10 allows automated video content acquisition and monitoring, topic segmentation, and media content adaptation for mobile devices. In addition, the MediaAlert system 10 also supports speech recognition. In one exemplary embodiment, it uses a two hundred thousand word vocabulary automatic speech recognizer. The MediaAlert system 10 presents an extensible architecture ready for integration with existing enterprise software in a standardized and vendor agnostic manner. The MediaAlert system 10 concentrates on the notification aspects, trying to offer an open generic common interface to alert management software that incorporates the business logic, workflow and decision aspects.

The exemplary embodiments of the present invention automatically track the broadcast news, extract the relevant news clips and send alerts to users on a wide spectrum of devices. This is a system for the automatic monitoring and the timely dissemination of multimedia information to a range of mobile information appliances based on each user's profile of interest. Those of skill in the art will understand from the above description that the MediaAlert system is extensible to support new devices and protocols. In addition to news clips, the present invention can be extended to other services, e.g., location related services. The service can be individual based or group based.

Unlike existing systems that rely on manually generated clips/stories, the system of the present invention uses multimodal story segmentation algorithms to find and isolate short relevant segments of video within a video program. Moreover, it relies on multimedia processing techniques to repurpose the content for delivery to a range of mobile devices with a wide range of presentation capabilities from text-only to full-motion video. The repurposing process is not only aimed at producing a representation of the information that accommodates the limitations of the device at hand, but is also aimed at creating alternative presentations that significantly reduce the amount of bandwidth needed to deliver the information.

Where the exemplary embodiments are targeted at mobile devices and used to generate alerts, requires higher selectivity in choosing the information and better isolation of the information. Such high selectivity is critical for preventing the generation of false or trivial alerts. This can be achieved by a combination of better information processing/retrieval techniques and good judgment on the part of the user in providing the right combination of keywords and phrases for each topic of interest. Imposing additional proximity constraints in the retrieval process is an effective way for increasing the relevance of extracted content and reducing the possibility of false alerts.

The combination of automatic media monitoring and alerting not only provides an effective system for timely delivery of personalized information and timely business information, but is also an effective way for automatically discovering and delivering security related information.

In addition, while not shown in the drawings, the exemplary embodiments of the present invention may also include a tracking and/or status module which may be implemented as part of the present invention. For example, each alert may be provided with an alert ID which is provided to the invoker of the alert. The invoker may then use this alert ID to track the status of the alert, e.g., complete, pending, delivery not possible, etc. The invoker (or platform) may take additional actions based on this status. For example, if a particular user has five (5) pending alerts that have not been delievered, the platform may queue additional alerts for that user until the pending alerts have been completed.

In addition, the network status and/or the user status may be reported back to the MediaAlert platform. For example, if the user is a mobile device and the device is out of communication with the mobile network, this status may be reported to the MediaAlert platform. The MediaAlert platform may then queue alerts until the device is back in communication with the network. Those of skill in the art will understand that there may be many other actions that are taken based on the status information.

MediaAlert has been designed to be a carrier grade solution both in terms of architecture scalability and flexibility to innovate and deploy new services rapidly. The media processing engine can ingest a large number of simultaneous real time broadcast quality feeds while the dissemination engine can handle a large number of concurrent alerts to meet stringent timing requirements.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A system comprising:
 a content acquisition platform executed on a processor and to receive media content including a video file and a related audio file of a broadcast television program broadcast without metadata and without closed captioning from a source and store the media content in a media storage platform;
 a media processing platform to segment the media content based upon predetermined criteria defined by a user, generate metadata in real time, and store the metadata in an index in the media storage platform, corresponding to the media content segmented, the metadata including a dialog approximation based on speech recognition of the media content by the media processing platform, a topic boundary, and a scene boundary;
 an alert platform to provide the user with:
  an immediate alert identifying the media content segmented, the immediate alert including a portion of the metadata stored in the media storage platform, the immediate alert transmitted to the user in response to the metadata generated in real time while the media content segmented is being received and before an entire media clip is received by the content acquisition platform, the media clip determined to be of interest to the user based on the predetermined criteria matching information derived from processing the media content in real time, the immediate alert transmitted to a device of the user identified in a subset of a user contact list, the subset identifying devices selected by the user from devices in the user contact list to be used for notification purposes; and
  a predictive alert identifying media content matching the user's profile that will be broadcast from the source at a later time, the predictive alert transmitted to a device of the user identified in the subset of a user contact list, the subset identifying devices selected by the user from devices in the user contact list to be used for notification purposes; and
 a content delivery platform to send the media content segmented to the device of the user.

2. The system of claim 1, wherein the audio file is one of an MP3 file, an MPEG-2 file and a wave file.

3. The system of claim 1, wherein the media processing platform includes an automatic speech recognition engine and the dialog approximation is derived from automatic speech recognition of the media content segmented.

4. The system of claim 1, wherein the predetermined criteria are stored in an interest profile for the user.

5. The system of claim 1, wherein the content delivery platform includes a content repurposing engine to format the media content segmented for display on the device.

6. The system of claim 5, wherein the content repurposing engine is to format the media content segmented based on information stored in a device profile for the user.

7. The system of claim 1, wherein the alert platform includes a gateway to handle protocol interfaces to the device.

8. The system of claim 7, wherein the protocol interfaces include one of an electronic mail protocol interface, a hypertext transfer protocol interface, a pager protocol interface, a facsimile protocol interface, a short message service protocol interface, an instant messaging protocol interface, a multimedia messaging service protocol interface, an audio protocol interface, a text-to-speech protocol interface and a voice smart message language protocol interface.

9. The system of claim 1, wherein the alert platform includes a server to perform one of device account verification and scheduling.

10. The system of claim 1, wherein the immediate alert includes one of text, an image, audio information and video information.

11. The system of claim 1, wherein the device is a mobile device.

12. The method of claim 1, further comprising:
a tracking module to track a status of a transmitted alert, wherein the transmitted alert includes a unique identification for tracking.

13. A method of alerting users of receipt of media content, comprising:
receiving, at a media processing platform, media content including a video file and a related audio file of a broadcast television program broadcast without metadata and without closed captioning from a source;
storing the media content in a media storage platform;
generating metadata in real time based on the media content;
segmenting the media content based upon predetermined criteria defined by a user;
storing the metadata in an index in the media storage platform, corresponding to the media content segmented, the metadata including a dialog approximation based on speech recognition of the media content by the media processing platform, a topic boundary, and a scene boundary;
creating an immediate alert identifying the media content segmented, the immediate alert including a portion of the metadata stored in the media storage platform, the immediate alert created in response to determining that a media clip being received is of interest to the user based on the predetermined criteria matching the metadata generated in real time while the media content segmented is being received, the immediate alert for transmission to the user before the media clip is entirely received;
creating a predictive alert in response to determining that media content matching the user's profile will be broadcast from the source at a later time; and
sending one of the immediate alert and the predictive alert to the user, the immediate alert transmitted to a device of the user identified in a subset of a user contact list, the subset identifying devices selected by the user from devices in the user contact list to be used for notification purposes, the predictive alert transmitted to a device of the user identified in the subset of a user contact list, the subset identifying devices selected by the user from devices in the user contact list to be used for notification purposes.

14. The method of claim 13 further comprising:
sending the media content segmented to a mobile device of the user.

15. The method of claim 14, wherein the sending is performed in response to a request for the media content segmented from the user.

16. The method of claim 14, further comprising:
converting the media content segmented into a form suitable for delivery to the mobile device.

17. The method of claim 13, wherein the immediate alert is in a format being one of an electronic mail, a hypertext transfer protocol message, a pager message, a facsimile, a short message service message, an instant message, a multimedia messaging service message and a voice message.

18. The method of claim 13, wherein the predetermined criteria includes one of a keyword and a topic selected by the user.

19. The method of claim 13, further comprising:
deriving metadata from the media content segmented including analyzing a transcript of an audio portion of the media content, the metadata indicating that upcoming content will be of interest to the user.

20. A system, comprising:
a processor; and
a memory to store computer program instructions, the computer program instructions when executed on the processor cause the processor to perform operations comprising:
receiving media content including a video file and a related audio file of a broadcast television program broadcast without metadata and without closed captioning from a source;
storing the media content in a media storage platform;
generating metadata in real time based on the media content;
segmenting the media content based upon predetermined criteria defined by a user;
storing the metadata in an index in the media storage platform, corresponding to the media content segmented, the metadata including a dialog approximation based on speech recognition of the media content by the processor, a topic boundary, and a scene boundary;
creating an immediate alert identifying the media content segmented, the immediate alert including a portion of the metadata stored in the media storage platform, the immediate alert created in response to determining that a media clip being received is of interest to the user based on predetermined criteria matching the metadata generated in real time while the media content segmented is being received, the immediate alert for transmission to the user before the media clip is entirely received;
creating a predictive alert in response to determining that media content matching the user's profile will be broadcast from the source at a later time; and
sending one of the immediate alert and the predictive alert to the user, the immediate alert transmitted to a device of the user identified in a subset of a user contact list, the subset identifying devices selected by the user from devices in the user contact list to be used for notification purposes, the predictive alert transmitted to a device of the user identified in the subset of a user contact list, the subset identifying devices selected by the user from devices in the user contact list to be used for notification purposes.

* * * * *